United States Patent
Kaiho et al.

(10) Patent No.: US 8,440,784 B2
(45) Date of Patent: May 14, 2013

(54) PROCESS FOR PRODUCING POLYARYLENE SULFIDE

(75) Inventors: Shu Kaiho, Nagoya (JP); Shunsuke Horiuchi, Nagoya (JP); Koji Yamauchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/387,034

(22) PCT Filed: Jul. 28, 2010

(86) PCT No.: PCT/JP2010/062659
§ 371 (c)(1),
(2), (4) Date: Mar. 16, 2012

(87) PCT Pub. No.: WO2011/013686
PCT Pub. Date: Feb. 3, 2011

(65) Prior Publication Data
US 2012/0165501 A1  Jun. 28, 2012

(30) Foreign Application Priority Data

Jul. 30, 2009 (JP) .................................. 2009-177241
Nov. 27, 2009 (JP) ................................ 2009-270061

(51) Int. Cl.
C08G 75/06 (2006.01)
C08G 75/04 (2006.01)
C08G 75/00 (2006.01)

(52) U.S. Cl.
USPC ........... 528/373; 528/374; 528/410; 528/412; 528/503

(58) Field of Classification Search .................. 528/373, 528/374, 410, 412, 503
See application file for complete search history.

(56) References Cited

U.S. PATENT DOCUMENTS 5,869,599 A  2/1999 Hay et al.

FOREIGN PATENT DOCUMENTS

| JP | 308828 A | 4/1991 |
| JP | 5105757 | 4/1993 |
| JP | 5163349 A | 6/1993 |
| JP | 5301962 A | 11/1993 |
| JP | 2008201885 A | 9/2008 |
| WO | WO2007034800 A1 | 3/2007 |

OTHER PUBLICATIONS

International Search Report dated Oct. 26, 2010, application No. PCT/JP2010/062659.
"Polymerization of poly(p-phenylene sulfide) from a Cyclic Precursor", Polymer, vol. 37, No. 14, 1996, pp. 3111-3116.
Macromolecules, 30, 1997, pp. 4502-4503.

*Primary Examiner* — Duc Truong
(74) *Attorney, Agent, or Firm* — RatnerPrestia

(57) ABSTRACT

Provided is a production process by which polyarylene sulfide can be obtained at a low temperature and in a short time, which production process is a process for producing polyarylene sulfide, comprising heating a cyclic polyarylene sulfide in the presence of a zero-valent transition metal compound. Examples of zero-valent transition metal compounds include complexes comprising, as metal species, nickel, palladium, platinum, silver, ruthenium, rhodium, copper, silver, and gold, and heating is preferably carried out in the presence of 0.001 to 20 mol % of the zero-valent transition metal compound based on sulfur atoms in the cyclic polyarylene sulfide.

8 Claims, 2 Drawing Sheets

PROCESS FOR PRODUCING POLYARYLENE SULFIDE

CROSS REFERENCE TO RELATED APPLICATIONS

This application is the U.S. National Phase application of PCT International Application No. PCT/JP2010/062659, filed Jul. 28, 2010, and claims priority to Japanese Patent Application No. 2009-177241, filed Jul. 30, 2009, and Japanese Patent Application No. 2009-270061, filed Nov. 27, 2009, the disclosures of which PCT and priority applications are incorporated herein by reference in their entirety for all purposes.

FIELD OF THE INVENTION

The present invention relates to a process for producing polyarylene sulfide, and more particularly to a process for producing polyarylene sulfide, comprising heating a cyclic polyarylene sulfide in the presence of a zero-valent transition metal compound.

BACKGROUND OF THE INVENTION

Polyarylene sulfide, typified by polyphenylene sulfide (which hereinafter may be referred to as PPS for short), is a resin having properties suitable for engineering plastics, such as excellent heat resistance, barrier properties, chemical resistance, electrical insulating properties, moist-heat resistance, and flame resistance. In addition, polyarylene sulfide can be molded by injection molding or extrusion molding into various molded parts, films, sheets, and fibers, and has been widely used in fields that require heat resistance and chemical resistance, such as various electrical and electronic parts, machine parts, and automotive parts.

As a specific process for producing this polyarylene sulfide, the process which involves reacting alkali metal sulfide such as sodium sulfide with a polyhalogenated aromatic compound such as p-dichlorobenzene in an organic amide solvent such as N-methyl-2-pyrrolidone has been proposed, which process has been widely utilized as an industrial process for producing polyarylene sulfide. However, this production process requires carrying out a reaction under the conditions of high temperature, high pressure, and strong alkaline, and further requires expensive high-boiling polar solvents such as N-methylpyrrolidone, thereby presenting a problem in that it is an energy-consuming process which costs much to recover solvents and requires high process cost.

On the other hand, as an alternative process for producing polyarylene sulfide, the process for producing polyarylene sulfide by heating cyclic polyarylene sulfide is disclosed. This process has been expected to provide polyarylene sulfide having a high molecular weight, a narrow molecular weight distribution, and a small weight loss when heated, but has had a problem in that, e.g., the reaction requires high temperature and a long time to complete the reaction of cyclic polyarylene sulfide (Patent Document 1 and Non-patent Document 1, for example).

The process in which, in converting cyclic polyarylene sulfide into polyarylene sulfide, various catalyst components (such as compounds effective to generate radicals and ionic compounds) are utilized to promote the conversion is known. Patent Document 2 and Non-patent Document 2 disclose as a compound effective to generate radicals a compound which generates sulfur radicals by, for example, being heated, specifically a compound containing a disulfide bond(s). Patent Documents 3 to 5 disclose a process using as an ionic compound an alkali metal salt of sulfur such as a sodium salt of thiophenol, for example, and as a Lewis acid a metal halide such as copper chloride (II), for example, as a catalyst. However, these processes also have a problem in that high temperature and a long time are required to complete the reaction of cyclic polyarylene sulfide, and there has been a need for a process for producing polyarylene sulfide at even lower temperature and in an even shorter time.

Patent Documents

[Patent Document 1] WO 2007/034800 (pp. 40 to 41)
[Patent Document 2] U.S. Pat. No. 5,869,599 (pp. 29 to 32)
[Patent Document 3] JP 5-163349 A (p. 2)
[Patent Document 4] JP 5-301962 A (p. 2)
[Patent Document 5] JP 5-105757 A (p. 2)

Non-Patent Documents

[Non-patent Document 1] Polymer, vol. 37, no. 14, 1996 (pp. 3111 to 3116)
[Non-patent Document 2] Macromolecules, 30, 1997 (pp. 4502 to 4503)

SUMMARY OF THE INVENTION

The present invention provides a production process by which the above-described drawback in that high temperature and a long time are required in the conversion of cyclic polyarylene sulfide into polyarylene sulfide can be overcome and polyarylene sulfide can be obtained at a low temperature and in a short time.

Thus, the present invention is as follows according to exemplary embodiments:

(1) A process for producing polyarylene sulfide, comprising heating a cyclic polyarylene sulfide in the presence of a zero-valent transition metal compound.

(2) The process for producing polyarylene sulfide according to (1), wherein the heating is carried out under substantially solvent-free conditions.

(3) The process for producing polyarylene sulfide according to either of claim 1 or 2, wherein the zero-valent transition metal compound is a compound comprising a Group 8 to Group 11 and Period 4 to Period 6 transition metal(s) of the periodic table.

(4) The process for producing polyarylene sulfide according to any one of (1) to (3), wherein the heating is carried out in the presence of 0.001 to 20 mol % of the zero-valent transition metal compound based on sulfur atoms in the cyclic polyarylene sulfide.

(5) The process for producing polyarylene sulfide according to any one of (1) to (4), wherein the heating is carried out at 300° C. or less.

(6) The process for producing polyarylene sulfide according to any one of (1) to (4), wherein the heating is carried out at 180 to 270° C.

(7) The process for producing polyarylene sulfide according to any one of (1) to (6), wherein the cyclic polyarylene sulfide comprises a cyclic compound represented by the Formula below in an amount of not less than 50% by weight and that m, the number of repetition, in the Formula is 4 to 50.

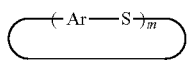

(8) The process for producing polyarylene sulfide according to any one of (1) to (7), wherein the cyclic polyarylene sulfide is cyclic polyphenylene sulfide.

The present invention provides a process for producing polyarylene sulfide, comprising heating a cyclic polyarylene sulfide in the presence of a zero-valent transition metal compound.

The present invention provides a process for producing polyarylene sulfide in which cyclic polyarylene sulfide can be heated at a lower temperature for a shorter time compared to the conventional process.

DETAILED DESCRIPTION OF THE INVENTION

Figure 1:
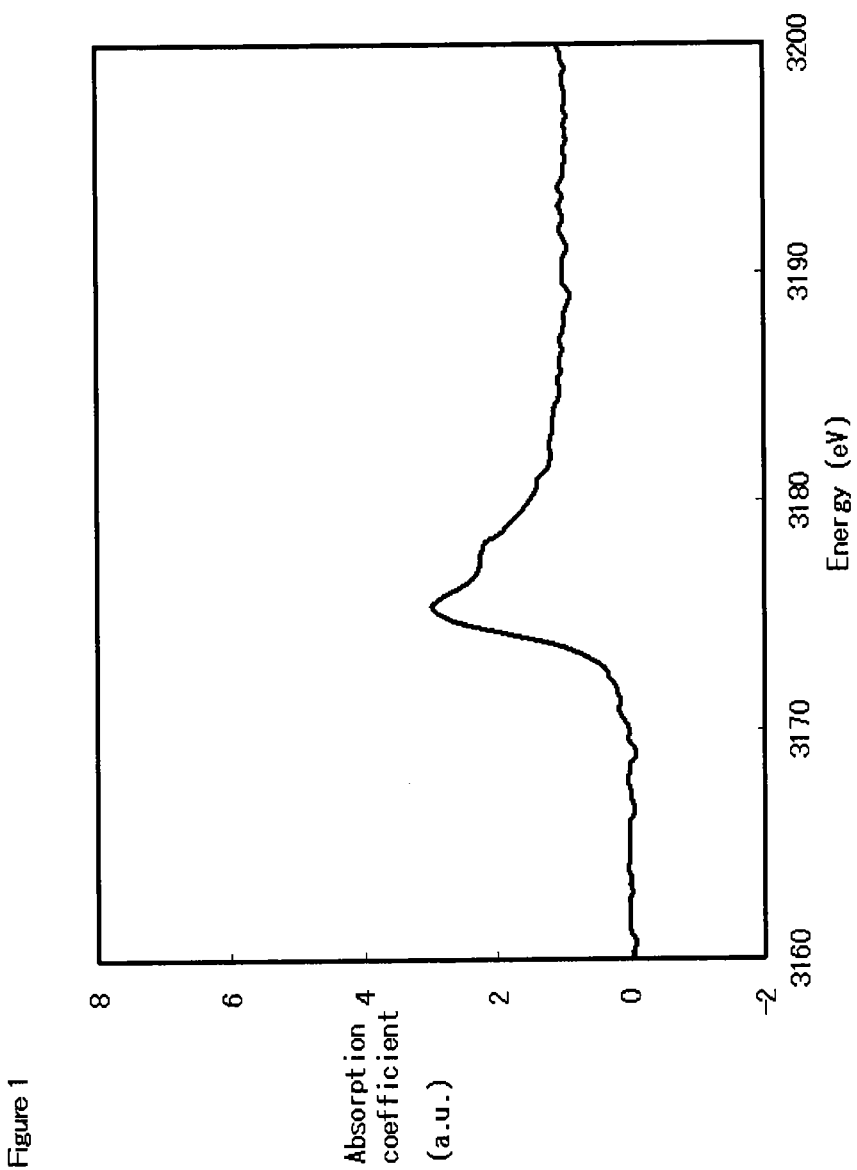
FIG. 1 is a chart of X-ray absorption fine structure analysis of tetrakis(triphenylphosphine)palladium.

Exemplary embodiments of the present invention will now be described.

<Polyarylene Sulfide>

The polyarylene sulfide is a homopolymer or copolymer having a repeating unit of formula: —(Ar—S)— as a main constituent unit and preferably containing the repeating unit in an amount of 80 mol % or more. Examples of Ar include units represented by Formula (A) to Formula (K) below, among which Formula (A) is particularly preferred.

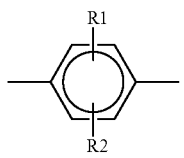

(A)

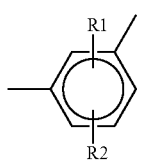

(B)

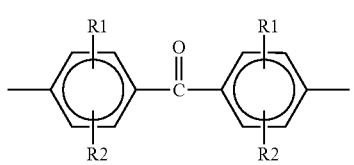

(C)

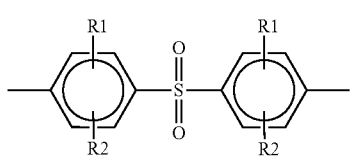

(D)

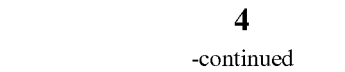

(E)

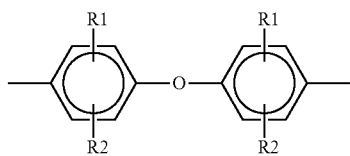

(F)

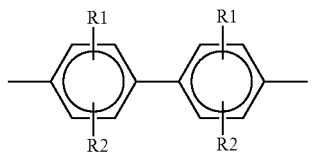

(G)

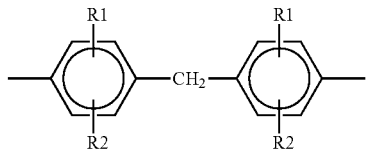

(H)

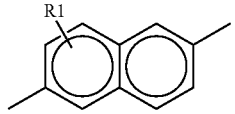

(I)

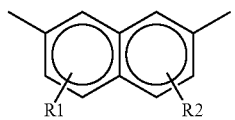

(J)

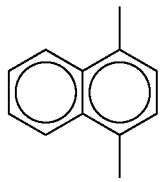

(K)

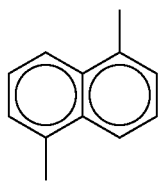

(R1 and R2 are a substituent selected from hydrogen, $C_1$-$C_{12}$ alkyl group, $C_1$-$C_{12}$ alkoxy group, $C_6$-$C_{24}$ arylene group, and halogen group, and R1 and R2 may be the same or different)

As long as these repeating units are a main constituent unit, a small amount of branch units or cross-linking units represented by, e.g., Formulas (L) to (N) below may be contained. The amount of copolymerization of such branch units or cross-linking units is preferably in the range of 0 to 1 mol % based on 1 mol of the unit: —(Ar—S)—.

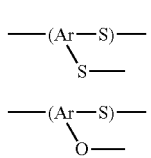

(L)

(M)

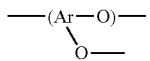

The polyarylene sulfide may be any of a random copolymer, a block copolymer, and mixtures thereof containing the above-described repeating unit.

Representative of these include polyphenylene sulfide, polyphenylene sulfide sulfone, polyphenylene sulfide ketone, and a random copolymer or a block copolymer thereof and mixtures thereof. Particularly preferred examples of polyarylene sulfide include polyphenylene sulfide containing, as a main constituent unit of the polymer, a p-phenylene sulfide unit:

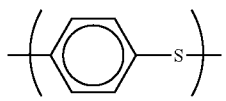

in an amount of 80 mol % or more, especially 90 mol % or more.

Preferred molecular weight of the polyarylene sulfide of the present invention is not less than 10,000, preferably not less than 15,000, and more preferably not less than 17,000, in terms of weight average molecular weight. The weight average molecular weight of not less than 10,000 allows a good moldability during processing and improved properties of molded articles, such as mechanical strength and chemical resistance. The upper limit of the weight average molecular weight is not particularly restricted, and examples of the preferred range include less than 1,000,000, more preferably less than 500,000, and still more preferably less than 200,000, within which ranges high molding processability can be achieved.

The polyarylene sulfide obtained by the production process is characterized in that its polydispersity, which is represented by the breadth of the molecular weight distribution, that is, the ratio of the weight average molecular weight to the number average molecular weight (weight average molecular weight/number average molecular weight), is narrow. The polydispersity of the polyarylene sulfide obtained by the process is preferably not more than 2.5, more preferably not more than 2.3, still more preferably not more than 2.1, and even more preferably not more than 2.0. In the case of the polydispersity of not more than 2.5, it is more likely that the amount of low-molecular-weight components contained in the polyarylene sulfide will decrease, which, in turn, is likely to be a factor of, for example, improved mechanical properties when the polyarylene sulfide is used for molding application, reduced gas yield when it is heated, and reduced amount of eluted components when it is contacted with a solvent. The weight average molecular weight and number average molecular weight described above can be determined, for example, by using SEC (Size Exclusion Chromatography) equipped with a differential refractive index detector.

The polyarylene sulfide obtained by the production process is characterized in that the gas yield during thermal processing is low because, for example, solvents such as N-methylpyrrolidone are not required unlike the conventional process, and known catalysts such as a compound effective to generate radicals and an ionic compound are not used.

The gas yield can be evaluated from the rate of weight loss upon heating, $\Delta Wr$, which is determined by the general thermogravimetric analysis and represented by the equation below.

$$\Delta Wr = (W1 - W2)/W1 \times 100$$

$\Delta Wr$ is a value determined from (W2), which is a sample weight at the time when 330° C. is reached, based on the sample weight (W1) at the time when 100° C. is reached, when thermogravimetric analysis is performed under a non-oxidizing atmosphere at atmospheric pressure from 50° C. to any temperature equal to or more than 330° C. at a rate of temperature rise of 20° C./min.

A non-oxidizing atmosphere at atmospheric pressure is used as an atmosphere in the thermogravimetric analysis. The non-oxidizing atmosphere refers to an atmosphere which has an oxygen concentration in the gas phase with which the sample is in contact of not more than 5% by volume, preferably not more than 2% by volume, and more preferably an atmosphere which is substantially free of oxygen, that is, an inert gas atmosphere such as nitrogen, helium, or argon, among which a nitrogen atmosphere is particularly preferred especially from the standpoint of economy and ease of handling. The atmospheric pressure means a pressure in the air in the near-standard state, that is, atmospheric pressure conditions near 101.3 kPa at a temperature near about 25° C. and an absolute pressure. The measurement atmosphere other than the above may cause, e.g., an oxidation of polyarylene sulfide during the measurement or may be significantly different from the atmosphere actually used in the molding of polyarylene sulfide, which cannot be a measurement in line with the practical use of polyarylene sulfide.

In the measurement of $\Delta Wr$, the thermogravimetric analysis is performed while increasing the temperature from 50° C. to any temperature equal to or more than 330° C. at a rate of temperature rise of 20° C./min. Preferably, the thermogravimetric analysis is performed while increasing the temperature at a rate of temperature rise of 20° C./min after holding at 50° C. for 1 minute. This temperature range is a temperature range frequently used when polyarylene sulfide typified by polyphenylene sulfide is practically used, and also a temperature range frequently used when polyarylene sulfide in the solid state is melted and then molded into any shape. The rate of weight loss in such a temperature range in practical use is related to the gas yield from polyarylene sulfide in practical use, the amount of components adhered to, for example, a die or a metal mold during molding, and the like. Therefore, it can be said that the polyarylene sulfide having a low rate of weight loss in such a temperature range is more high-quality and excellent polyarylene sulfide. The measurement of $\Delta Wr$ is desirably performed using a sample amount of about 10 mg, and the shape of a sample is desirably a fine granule of about 2 mm or less.

The rate of weight loss upon heating as described above, $\Delta Wr$, of the polyarylene sulfide obtained by the process is preferably not more than 0.20%, more preferably not more than 0.16%, still more preferably not more than 0.13%, and even more preferably not more than 0.10%.

When $\Delta Wr$ is beyond the above-described range, problems such as high gas yield during molding of polyarylene sulfide, for example, tend to occur easily, which is not preferred, and, in addition, increased adhesion to a die or a dice in extrusion molding and to a metal mold in injection molding tends to reduce the productivity, which is not preferred.

The process for producing the polyarylene sulfide is characterized by obtaining the polyarylene sulfide by heating cyclic polyarylene sulfide in the presence of a zero-valent transition metal compound, which process can readily provide the polyarylene sulfide having the above-mentioned properties.

The conversion of cyclic polyarylene sulfide into polyarylene sulfide in the process is preferably 70% or more, more preferably 80% or more, and still more preferably 90% or more. When the conversion is 70% or more, the polyarylene sulfide having the above-mentioned properties can be obtained.

<Cyclic Polyarylene Sulfide>

The cyclic polyarylene sulfide in the process for producing polyarylene sulfide comprises a cyclic compound as represented by Formula (O) below, which has a repeating unit of formula: —(Ar—S)— as a main constituent unit and preferably contains the repeating unit in an amount of 80 mol % or more, in an amount of at least 50% by weight or more, preferably 70% by weight or more, more preferably 80% by weight or more, and still more preferably 90% by weight or more. Examples of Ar include units represented by, e.g., Formula (A) to Formula (K) described above, among which Formula (A) is particularly preferred.

(O)

The cyclic compound of the above-described Formula (O) in the cyclic polyarylene sulfide may comprise a repeating unit(s) such as Formula (A) to Formula (K) described above randomly or in blocks, or may be any of the mixtures thereof. Representative of these include cyclic polyphenylene sulfide, cyclic polyphenylene sulfide sulfone, cyclic polyphenylene sulfide ketone, cyclic random copolymer and cyclic block copolymer comprising them, and mixtures thereof. Particularly preferred examples of the cyclic compound of the above-described Formula (O) include a cyclic compound containing, as a main constituent unit, a p-phenylene sulfide unit:

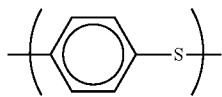

in an amount of 80 mol % or more, especially 90 mol % or more.

m, the number of repetition in the above-described Formula (O) contained in the cyclic polyarylene sulfide, is not particularly restricted; examples of the preferred range include 4 to 50, more preferably 4 to 25, and still more preferably 4 to 15, and the cyclic compound of the above-described Formula (O) having the number of not less than 8 as a principal component is even more preferred. As described below, the conversion of cyclic polyarylene sulfide into polyarylene sulfide by means of heating is preferably performed at or above the temperature at which cyclic polyarylene sulfide melts, but the larger m is, the more likely it is that the melting temperature of cyclic polyarylene sulfide is high; therefore, it is advantageous that m is in the above-described range from the standpoint that the conversion of cyclic polyarylene sulfide into polyarylene sulfide can be performed at a lower temperature. Cyclic compounds with m being 7 or less tend to have a low reactivity, and therefore it is advantageous that m is not less than 8 from the standpoint that the polyarylene sulfide can be obtained in a short time.

Although the cyclic compound of the above-described Formula (O) contained in the cyclic polyarylene sulfide may be either of a single compound having a single number of repetition or a mixture of cyclic compounds having a different number of repetition, a mixture of cyclic compounds having a different number of repetition is preferred because it tends to have a lower melting temperature than that of a single compound having a single number of repetition and the use of a mixture of cyclic compounds having a different number of repetition lowers the temperature when performing the conversion into polyarylene sulfide.

Components other than the cyclic compound of the above-described Formula (O) in the cyclic polyarylene sulfide are particularly preferably a polyarylene sulfide oligomer. Polyarylene sulfide oligomer as used herein refers to a linear homooligomer or cooligomer having a repeating unit of formula: —(Ar—S)— as a main constituent unit and preferably containing the repeating unit in an amount of 80 mol % or more. Examples of Ar include units represented by, e.g., Formula (A) to Formula (K) described above, among which Formula (A) is particularly preferred. As long as these repeating units are a main constituent unit, the polyarylene sulfide oligomer can comprise a small amount of a branch unit or a cross-linking unit represented by, e.g., the above-described Formula (L) to Formula (N). The amount of copolymerization of such a branch unit or a cross-linking unit is preferably in the range of 0 to 1 mol % based on 1 mol of the unit: —(Ar—S)—. The polyarylene sulfide oligomer may be any of a random copolymer, a block copolymer, and mixtures thereof containing the above-described repeating unit.

Representative of these include a polyphenylene sulfide oligomer, a polyphenylene sulfide sulfone oligomer, a polyphenylene sulfide ketone oligomer, a random copolymer and a block copolymer thereof, and mixtures thereof. Particularly preferred examples of polyarylene sulfide oligomers include a polyphenylene sulfide oligomer containing, as a main constituent unit of the polymer, a p-phenylene sulfide unit in an amount of 80 mol % or more, especially 90 mol % or more.

Examples of the molecular weight of the polyarylene sulfide oligomer include lower molecular weight than that of the polyarylene sulfide. Specifically, the weight average molecular weight less than 10,000 is preferred.

The amount of polyarylene sulfide oligomers contained in the cyclic polyarylene sulfide is particularly preferably lower than that of the cyclic compound of the above-described Formula (O) contained in the cyclic polyarylene sulfide. That is, the weight ratio of the cyclic compound of the above-described Formula (O) to polyarylene sulfide oligomers in the cyclic polyarylene sulfide (the cyclic compound of the above-described Formula (O)/polyarylene sulfide oligomer) is preferably more than 1, more preferably 2.3 or more, still more preferably 4 or more, and even more preferably 9 or more. By using such a cyclic polyarylene sulfide, the polyarylene sulfide having a weight average molecular weight of not less than 10,000 can be readily obtained. Therefore, the larger the value of the weight ratio of the cyclic compound of the above-described Formula (O) to polyarylene sulfide oligomers in the cyclic polyarylene sulfide is, the more likely it is that the weight average molecular weight of the polyarylene sulfide obtained by the process for producing polyarylene sulfide is high. Thus, there is no upper limit to the weight ratio, and to obtain cyclic polyarylene sulfide with the weight ratio being more than 100, it is necessary to significantly reduce the polyarylene sulfide oligomer content in the cyclic polyarylene sulfide, which requires much labor. According to the process for producing polyarylene sulfide according to exemplary embodiments of the present invention, the polyarylene sulfide having a weight average molecular weight of not less than 10,000 can be readily obtained even when using the cyclic polyarylene sulfide with the weight ratio being not more than 100.

The upper limit value of the molecular weight of the cyclic polyarylene sulfide used to produce the polyarylene sulfide of the present invention is, in terms of weight average molecular weight, preferably not more than 10,000, preferably not more than 5,000, and more preferably not more than 3,000, whereas the lower limit value is, in terms of weight average molecular weight, preferably not less than 300, preferably not less than 400, and more preferably not less than 500.

<Zero-Valent Transition Metal Compound>

In exemplary embodiments of the present invention, various zero-valent transition metal compounds are used as a polymerization catalyst. Preferably, a Group 8 to Group 11 and Period 4 to Period 6 transition metal(s) of the periodic table is/are preferably used as a zero-valent transition metal. Examples of metal species include, for example, nickel, palladium, platinum, iron, ruthenium, rhodium, copper, silver, and gold. As a zero-valent transition metal compound, various complexes are suitable, examples of which include those containing as a ligand triphenylphosphine, tri-t-butylphosphine, tricyclohexylphosphine, 1,2-bis(diphenylphosphino) ethane, 1,1'-bis(diphenylphosphino)ferrocene, dibenzylideneacetone, dimethoxydibenzylideneacetone, cyclooctadiene or carbonyl. Specific examples include bis(dibenzylideneacetone)palladium, tris(dibenzylideneacetone)dipalladium, tetrakis(triphenylphosphine)palladium, bis(tri-t-butylphosphine)palladium, bis[1,2-bis(diphenylphosphino)ethane]palladium, bis(tricyclohexylphosphine)palladium, [P,P'-1,3-bis(di-1-propylphosphino)propane][P-1,3-bis(di-1-propylphosphino)propane]palladium, 1,3-bis(2,6-di-1-propylphenyl)imidazol-2-ylidene(1,4-naphthoquinone) palladium dimer, 1,3-bis(2,4,6-trimethylphenyl)imidazol-2-ylidene(1,4-naphthoquinone)palladium dimer, bis(3,5,3',5'-dimethoxydibenzylideneacetone)palladium, bis(tri-t-butylphosphine)platinum, tetrakis(triphenylphosphine) platinum, tetrakis(trifluorophosphine)platinum, ethylene bis (triphenylphosphine)platinum, platinum-2,4,6,8-tetramethyl-2,4,6,8-tetravinyl cyclotetrasiloxane complex, tetrakis(triphenylphosphine)nickel, tetrakis(triphenyl phosphite)nickel, bis(1,5-cyclooctadiene)nickel, triiron dodecacarbonyl, iron pentacarbonyl, tetrarhodium dodecacarbonyl, hexarhodium hexadecacarbonyl, and triruthenium dodecacarbonyl. These polymerization catalysts may be used alone, or two or more of them may be used in mixture or in combination.

These polymerization catalysts may be provided by adding the zero-valent transition metal compound described above or by forming the zero-valent transition metal compound in the system. Examples of processes for forming a zero-valent transition metal compound within the system as in the latter case include a process of forming a complex of the transition metal within the system by adding a transition metal compound such as a salt of a transition metal and a compound acting as a ligand, or a process of adding a complex formed from a transition metal compound such as a salt of a transition metal and a compound acting as a ligand. Transition metal salts other than zero-valent do not promote the conversion of cyclic polyarylene sulfide, and therefore a compound acting as a ligand needs to be added. Examples of transition metal compounds, ligands, and complexes formed from the transition metal compound and the ligand used are listed below. Examples of transition metal compounds for forming a zero-valent transition metal compound within the system include, for example, acetates and halides of various transition metals. Examples of transition metal species include, for example, acetates and halides of nickel, palladium, platinum, iron, ruthenium, rhodium, copper, silver, and gold: specifically, nickel acetate, nickel chloride, nickel bromide, nickel iodide, nickel sulfide, palladium acetate, palladium chloride, palladium bromide, palladium iodide, palladium sulfide, platinum chloride, platinum bromide, iron acetate, iron chloride, iron bromide, iron iodide, ruthenium acetate, ruthenium chloride, ruthenium bromide, rhodium acetate, rhodium chloride, rhodium bromide, copper acetate, copper chloride, copper bromide, silver acetate, silver chloride, silver bromide, gold acetate, gold chloride, and gold bromide. Although ligands simultaneously added to form a zero-valent transition metal compound within the system is not particularly restricted as long as they produce a zero-valent transition metal when cyclic polyarylene sulfide and a transition metal compound are heated, basic compounds are preferred, examples of which include, for example, triphenylphosphine, tri-t-butylphosphine, tricyclohexylphosphine, 1,2-bis(diphenylphosphino)ethane, 1,1'-bis(diphenylphosphino)ferrocene, dibenzylideneacetone, sodium carbonate, and ethylenediamine. Examples of complexes formed from a transition metal compound and a compound acting as a ligand include a complex consisting of various transition metal salts as described above and a ligand. Specific examples include bis(triphenylphosphine)palladium diacetate, bis(triphenylphosphine)palladium dichloride, [1,2-bis(diphenylphosphino)ethane]palladium dichloride, [1,1'-bis(diphenylphosphino)ferrocene]palladium dichloride, dichloro(1,5'-cyclooctadiene)palladium, bis(ethylenediamine)palladium dichloride, bis(triphenylphosphine)nickel dichloride, [1,2-bis(diphenylphosphino)ethane]nickel dichloride, [1,1'-bis (diphenylphosphino)ferrocene]nickel dichloride, and dichloro(1,5'-cyclooctadiene)platinum. These polymerization catalysts and ligands may be used alone, or two or more of them may be used in mixture or in combination.

The valence state of a transition metal compound can be analyzed by X-ray absorption fine structure (XAFS) analysis. It can be analyzed by radiating an X-ray to the transition metal compound or the cyclic polyarylene sulfide comprising the transition metal compound or polyarylene sulfide comprising the transition metal compound used as a catalyst, and comparing the peak maxima of the absorption coefficient at the time when the absorption spectra were normalized.

For example, when evaluating the valence of a palladium compound, it is effective to compare the absorption spectra related to X-ray absorption near edge structure (XANES) at the L3 edge; it can be determined by comparing the peak maxima of the absorption coefficient at the time when the average absorption coefficient within the range of 3163 to 3168 eV were normalized to 0, and the average absorption coefficient within the range of 3191 to 3200 eV to 1, using the point where the energy of the X-ray is 3173 eV as a reference. In the case of palladium, zero-valent palladium compounds, compared to divalent palladium compounds, have a tendency to have a small peak maximum of the absorption coefficient when normalized, and, in addition, there is a tendency that transition metal compounds having a greater effect of promoting the conversion of cyclic polyarylene sulfide have a smaller peak maximum. It is assumed that this is because absorption spectra related to XANES correspond to the transition of an inner-shell electron to a vacant orbital, and the absorption peak intensity is influenced by the electron density of the d orbital.

In order for a palladium compound to promote the conversion of cyclic polyarylene sulfide into PPS, the peak maximum of the absorption coefficient when normalized is preferably not more than 6, more preferably not more than 4, and still more preferably not more than 3, within which ranges the conversion of cyclic polyarylene sulfide can be promoted.

Specifically, the peak maximum of divalent palladium chloride that does not promote the conversion of cyclic polyarylene sulfide is 6.32, and those of zero-valent tris(dibenzylideneacetone)dipalladium and tetrakis(triphenylphosphine)palladium and bis[1,2-bis(diphenylphosphino)ethane] palladium that promote the conversion of cyclic polyarylene sulfide are 3.43 and 2.99 and 2.07, respectively.

Although the concentration of the polymerization catalyst used varies depending on the intended molecular weight of the polyarylene sulfide and the type of the polymerization catalyst, it is generally 0.001 to 20 mol %, preferably 0.005 to 15 mol %, and more preferably 0.01 to 10 mol %, based on sulfur atoms in the cyclic polyarylene sulfide. When it is not less than 0.001 mol %, cyclic polyarylene sulfide converts sufficiently into polyarylene sulfide, and when not more than 20 mol %, the polyarylene sulfide having the above-mentioned properties can be obtained.

The above-described polymerization catalyst may be added as it is, and after the polymerization catalyst was added to cyclic polyarylene sulfide, it is preferable to disperse the resulting mixture homogeneously. Examples of method of homogeneous dispersion include, for example, a method of mechanical dispersion and a method of dispersion using a solvent. Specific examples of methods of mechanical dispersion include a method using a grinder, a stirrer, a mixer, a shaker, or a mortar. Specific examples of methods of dispersion using a solvent include a method of dissolving or dispersing cyclic polyarylene sulfide in an appropriate solvent, adding a predetermined amount of a polymerization catalyst thereto, and then removing the solvent. In the dispersion of a polymerization catalyst, when the polymerization catalyst is solid, the average particle size of the polymerization catalyst is preferably not more than 1 mm because it allows more homogeneous dispersion.

<Production Conditions of Polyarylene Sulfide>

The heating temperature during production of the polyarylene sulfide is preferably temperatures at which cyclic polyarylene sulfide melts, and any conditions may be used without restriction as long as they are such temperature conditions. However, when the heating temperature is less than the melting temperature of cyclic polyarylene sulfide, there is a tendency that a long time is required for obtaining polyarylene sulfide. Although the temperature at which cyclic polyarylene sulfide melts cannot be uniquely determined because it varies depending on the composition and molecular weight of the cyclic polyarylene sulfide and the environments during heating, the melting temperature can be analyzed by, for example, analyzing the cyclic polyarylene sulfide using differential scanning calorimetry. Examples of the lower limit of the heating temperature include 180° C. or more, preferably 200° C. or more, more preferably 220° C. or more, and still more preferably 240° C. or more. Within these temperature ranges, cyclic polyarylene sulfide melts, and polyarylene sulfide can be obtained in a short time. On the other hand, when the temperature is too high, there is a tendency that undesirable side reactions typified by cross-linking reaction and decomposition reaction between cyclic polyarylene sulfides, between polyarylene sulfides generated by heating, and between polyarylene sulfide and cyclic polyarylene sulfide are likely to occur. It is desirable to avoid the temperature at which such undesirable side reactions significantly occur, because the resultant polyarylene sulfide can have deteriorated properties. Examples of the upper limit of the heating temperature include 400° C. or less, preferably 360° C. or less, more preferably 320° C. or less, still more preferably 300° C. or less, and even more preferably 270° C. or less. In the case of these temperatures or less, there is a tendency that adverse effects on the properties of the resultant polyarylene sulfide due to the undesirable side reactions can be prevented, and the polyarylene sulfide having the above-mentioned properties can be obtained.

Although the reaction time cannot be equally defined because it varies depending on the content and the number of repetition (m) of the cyclic compound of the above-described Formula (O) and various properties such as molecular weight in the cyclic polyarylene sulfide used, the type of the polymerization catalyst used, and conditions such as heating temperature, it is preferably set so as to avoid the above-described undesirable side reactions as much as possible. Examples of heating time include 0.01 to 100 hours, preferably 0.05 to 20 hours, and more preferably 0.05 to 10 hours. According to the preferable production process of the present invention, the heating of cyclic polyarylene sulfide can also be performed for not more than 2 hours. Examples of heating time include not more than 2 hours, in addition, not more than 1 hour, not more than 0.5 hours, not more than 0.3 hours, and not more than 0.2 hours. When it is not less than 0.01 hours, cyclic polyarylene sulfide converts sufficiently into polyarylene sulfide, and when not more than 100 hours, there is a tendency that adverse effects on the properties of the resultant polyarylene sulfide due to the undesirable side reactions can be prevented.

The heating of cyclic polyarylene sulfide can also be performed under substantially solvent-free conditions. When the heating is performed under such conditions, there is a tendency that the temperature can be raised in a short time; the reaction rate is high; and polyarylene sulfide can readily be obtained in a short time. Substantially solvent-free conditions as used herein means that the solvent in cyclic polyarylene sulfide is not more than 10% by weight, and it is more preferably not more than 3% by weight.

The above-described heating may be performed, needless to say, by the method using a general polymerization reactor, and may also be performed in a mold for producing a molded article. Further, the heating can be performed by using any apparatus such as an extruder and a melt-kneader as long as it is equipped with a heating mechanism, and known methods such as the batch mode and the continuous mode may be employed.

The heating of cyclic polyarylene sulfide is preferably performed in a non-oxidizing atmosphere, and also preferably performed under reduced pressure conditions. When the heating is performed under reduced pressure conditions, it is preferable to bring the reaction system once under a non-oxidizing atmosphere before establishing the reduced pressure conditions. There is a tendency that this can inhibit the occurrence of undesirable side reactions such as cross-linking reaction and decomposition reaction between cyclic polyarylene sulfides, between polyarylene sulfides generated by heating, and between polyarylene sulfide and cyclic polyarylene sulfide. Non-oxidizing atmosphere refers to an atmosphere which has an oxygen concentration in the gas phase with which the cyclic polyarylene sulfide is in contact of not more than 5% by volume, preferably not more than 2% by volume, and more preferably an atmosphere which is substantially free of oxygen, that is, an inert gas atmosphere such as nitrogen, helium, or argon, among which a nitrogen atmosphere is preferred especially from the standpoint of economy and ease of handling. Reduced pressure conditions mean that the pressure in the system in which the reaction is carried out is lower than the atmospheric pressure, and the upper limit is preferably not more than 50 kPa, more preferably not more than 20 kPa, and still more preferably not more than 10 kPa. Examples of lower limits include not less than 0.1 kPa, more preferably not less than 0.2 kPa. Under conditions using a reduced pressure of not less than the preferable lower limit, the low-molecular-weight cyclic compound of the above-described Formula (O) contained in the cyclic polyarylene sulfide is less prone to strip, whereas under conditions using a reduced pressure of not more than the preferable upper limit, undesirable side reactions such as cross-linking reaction are less likely to occur, and the polyarylene sulfide having the above-mentioned properties can be obtained. The heating of the cyclic polyarylene sulfide can also be performed under pressured conditions. When the heating is performed under pressured conditions, it is preferable to bring the reaction system once under a non-oxidizing atmosphere before establishing the pressured conditions. Pressured conditions mean that the pressure in the system in which the reaction is carried out is higher than the atmospheric pressure, and although the upper limit is not particularly restricted, it is preferably not more than 0.2 MPa from the standpoint of ease of handling of the reactor. Under such conditions, polymerization catalysts are less prone to strip on heating, and the polyarylene sulfide can be obtained in a short time.

The heating of cyclic polyarylene sulfide described above can also be performed in the co-presence of a fibrous material. Fibrous material as used herein refers to a thin threadlike material, and it is preferably any material having a narrowly elongated structure like natural fibers. By performing the conversion of cyclic polyarylene sulfide into polyarylene sulfide in the presence of a fibrous material, a composite material structure consisting of polyarylene sulfide and a fibrous material can readily be produced. Since such a structure is reinforced with a fibrous material, it tends to have, for example, excellent mechanical properties compared to the case of polyarylene sulfide alone.

Among various fibrous materials, reinforcement fibers made of continuous fibers are preferably used, thereby allowing high reinforcement of polyarylene sulfide. Generally, when producing a composite material structure consisting of a resin and a fibrous material, the high viscosity of the resin when melted is likely to result in poor wetting of the resin and the fibrous material. Accordingly, in many cases, uniform composite materials cannot be produced, or expected mechanical properties are not expressed. Wetting as used herein means that there is a physically good and maintained contact of a fluid material such as a molten resin and a solid substrate such as a fibrous compound such that air or other gas is substantially not captured between the fluid material and the solid substrate. There is a tendency that the lower the viscosity of the fluid material is, the better the wetting with the fibrous material is. The cyclic polyarylene sulfide according to exemplary embodiments of the present invention has a significantly low viscosity when melted compared to common thermoplastic resins, for example, polyarylene sulfide, and therefore the wetting with the fibrous material is likely to be good. According to the process for producing polyarylene sulfide according to exemplary embodiments of the present invention, cyclic polyarylene sulfide converts into polyarylene sulfide after the cyclic polyarylene sulfide and the fibrous material formed good wetting, and therefore a composite material structure in which the fibrous material and the polyarylene sulfide formed good wetting can be readily obtained.

As a fibrous material, reinforcement fibers made of continuous fibers are preferable as mentioned above, and reinforcement fibers used in the present invention are not particularly restricted. Examples of reinforcement fibers suitably used include, in general, fibers having a good heat-resistance and tensile strength used as a high-performance reinforcement fiber. Examples of the reinforcement fibers include glass fibers, carbon fibers, graphite fibers, aramid fibers, silicon carbide fibers, alumina fibers, and boron fibers. Among them, carbon fibers and graphite fibers, which have a good specific strength and specific modulus and are known to make a great contribution to weight saving, can be exemplified as the best one. As carbon fibers and graphite fibers, any type of carbon fibers and graphite fibers can be used depending on the intended use, but high-strength and high-elasticity carbon fibers having a tensile strength of 450 Kgf/mm2 and a tensile elasticity of 1.6% or more are most suitable. When using continuous fibrous reinforcement fibers, the length is preferably not less than 5 cm. When the length is within this range, it is easy to express the strength of the reinforcement fibers sufficiently as a composite material. The carbon fibers and graphite fibers may also be used in a mixture with other reinforcement fibers. The reinforcement fibers are not restricted in their shape or arrangement and may be used, for example, even if they are arranged in a single direction or a random direction, or have a shape of a sheet, a mat, a fabric, or a braid. Although the arrangement where reinforcement fibers are drawn and aligned in a single direction is most suitable especially for the application requiring a high specific strength and specific modulus, the easy-to-handle cloth-like (fabric-like) arrangement is also suitable for the present invention.

The conversion of cyclic polyarylene sulfide into polyarylene sulfide described above can also be performed in the presence of a filler(s). Examples of fillers include, for example, non-fibrous glass, non-fibrous carbon, and inorganic fillers such as calcium carbonate, titanium oxide, and alumina.

EXAMPLES

Aspects of the present invention will now be described in detail by way of examples. These examples are illustrative and not restrictive.
<Measurement of Molecular Weight>
With respect to the molecular weight of polyarylene sulfide and cyclic polyarylene sulfide, polystyrene-equivalent number average molecular weight (Mn) and weight average molecular weight (Mw) were calculated using gel permeation chromatography (GPC), which is a type of size exclusion chromatography (SEC). The measurement conditions of GPC are shown below.
Apparatus: SSC-7100, Senshu Scientific Co.
Column: GPC 3506, Senshu Scientific Co.
Eluent: 1-chloro naphthalene
Detector: differential refractive index detector
Column temperature: 210° C.
Pre-thermostat bath temperature: 250° C.
Pump thermostat bath temperature: 50° C.
Detector temperature: 210° C.
Flow rate: 1.0 mL/min
Sample injection volume: 300 μL (slurry: about 0.2% by weight).
<Measurement of Conversion>
The calculation of the conversion of cyclic polyphenylene sulfide into polyphenylene sulfide was performed using high-performance liquid chromatography (HPLC) by the process described below.

The product of about 10 mg obtained by heating cyclic polyarylene sulfide was dissolved in about 5 g of 1-chloro naphthalene at 250° C. and cooled to room temperature to form a precipitate. Using a membrane filter having a pore size of 0.45 μm, 1-chloro naphthalene insoluble matter was filtered off to obtain 1-chloro naphthalene soluble matter. The amount of unreacted cyclic polyarylene sulfide was quantitatively determined by HPLC determination of the obtained soluble matter, and the conversion of cyclic polyarylene sulfide into polyarylene sulfide was calculated. The measurement conditions of HPLC are shown below.

Apparatus: LC-10Avp series manufactured by Shimadzu Corporation
Column: Mightysil RP-18 GP150-4.6 (5 μm)
Detector: photodiode array detector (UV=270 nm).

<Measurement of the Rate of Weight Loss Upon Heating of Polyarylene Sulfide>

The rate of weight loss upon heating of polyarylene sulfide was performed under the following conditions using a thermogravimetric analyzer. Fine granules of not more than 2 mm were used as a sample.

Apparatus: TGA7 manufactured by PerkinElmer Co.
Measurement atmosphere: under a nitrogen stream
Weight of sample added: about 10 mg
Measurement Conditions:
(a) Maintain at a programmed temperature of 50° C. for 1 minute
(b) Increase the temperature from the programmed temperature of 50° C. to 350° C.
The rate of temperature rise: 20° C./min <Measurement of X-Ray Absorption Fine Structure (XAFS)>

The X-ray absorption fine structure of a transition metal compound was performed under the following conditions.
Experimental facility: High Energy Accelerator Research Organization (KEK)
Photon Factory
Experimental station: BL-9A
Spectroscope: Si (111) 2 crystal spectroscope
Absorption edge: Pd-L3 (3180 eV) absorption edge
Detection method: fluorescence yield
Detector used: Ionization Chamber (using the gas of N2 (30%)+He (70%)), Lytle detector (using Ar gas)
Sample preparation: smear a carbon tape with a powder sample
Measurement conditions: 0.35 eV step, 1 sec/step
Analysis conditions: E0: 3173.0 eV, pre-edge range: −10 to −5 eV, normalization range: 18 to 27 eV Reference Example 1

Preparation of Cyclic Polyarylene Sulfide

To a stainless-steel autoclave equipped with a stirrer, 14.03 g (0.120 mol) of a 48% by weight aqueous solution of sodium hydrosulfide, 12.50 g (0.144 mol) of a 48% by weight aqueous solution prepared using 96% sodium hydroxide, 615.0 g (6.20 mol) of N-methyl-2-pyrrolidone (NMP), and 18.08 g (0.123 mol) of p-dichlorobenzene (p-DCB) were charged. The reaction vessel was thoroughly replaced with nitrogen, and then hermetically sealed under nitrogen gas.

While stirring at 400 rpm, the temperature was raised from room temperature to 200° C. over about 1 hour. At this point, the pressure in the reaction vessel was 0.35 MPa in gauge pressure. Thereafter, the temperature was raised from 200° C. to 270° C. over about 30 minutes. The pressure in the reaction vessel at this point was 1.05 MPa in gauge pressure. After holding at 270° C. for 1 hour, the reaction vessel was rapidly cooled to near room temperature, and then the contents were recovered.

Analysis of the obtained contents by gas chromatography and high-performance liquid chromatography showed that the consumption rate of monomeric p-DCB was 93% and that the production rate of cyclic PPS based on the assumption that all the sulfur components in the reaction mixture convert into cyclic PPS was 18.5%.

With about 1500 g of ion exchanged water, 500 g of the obtained contents were diluted, and then filtered through a glass filter having an average mesh opening size of 10 to 16 μm. The components retained on the filter were dispersed in about 300 g of ion exchanged water and stirred at 70° C. for 30 minutes. The same filtering operation as described above was repeated for a total of three times to obtain a white solid. This was vacuum-dried overnight at 80° C. to obtain a dry solid.

The solid obtained was placed in an extraction thimble, and low-molecular-weight components contained in the solid content were separated by performing Soxhlet extraction for about 5 hours using chloroform as a solvent.

Solid components remaining in the extraction thimble after the extraction operation were dried at 70° C. overnight under reduced pressure to obtain about 6.98 g of an off-white solid. As a result of the analysis, the absorption spectrum in the infrared spectroscopic analysis showed that this was a compound having phenylene sulfide structure, and the weight average molecular weight was 6,300.

The solvent was removed from the extract obtained by the extraction operation using chloroform, and then about 5 g of chloroform was added to prepare a slurry, which was added dropwise with stirring to about 300 g of methanol. The precipitate thus obtained was recovered by filtration and vacuum-dried at 70° C. for 5 hours to obtain 1.19 g of white powder. From the absorption spectrum in the infrared spectroscopic analysis, this white powder was confirmed to be a compound composed of phenylene sulfide units. Further, from mass spectrum analysis of the components resolved by high-performance liquid chromatography (apparatus; M-1200H manufactured by Hitachi, Ltd.), and furthermore from the molecular weight information from MALDI-TOF-MS, this white powder proved to be cyclic polyphenylene sulfide which has a p-phenylene sulfide unit as a main constituent unit, comprises a cyclic compound with the number of repetition of the unit being 4 to 13 in an amount of about 99% by weight, and is suitably used to produce the polyarylene sulfide of the present invention. GPC determination showed that the cyclic polyphenylene sulfide was completely soluble in 1-chloro naphthalene at room temperature and that the weight average molecular weight was 900.

Reference Example 2

An autoclave was charged with 118 g (1 mol) of 47% sodium hydrosulfide, 42.9 g (1.03 mol) of 96% sodium hydroxide, 162 g (1.64 mol) of N-methyl-2-pyrrolidone (NMP), 23.3 g (0.283 mol) of sodium acetate, and 150 g of ion exchanged water, and gradually heated to 235° C. at atmospheric pressure under nitrogen over about 3 hours. After distilling 213 g of water and 4.0 g (40.4 mmol) of NMP, the reaction vessel was cooled to 160° C. The amount of scattered hydrogen sulfide was 25 mmol.

Next, 148 g (1.01 mol) of p-dichlorobenzene (p-DCB) and 131 g (1.33 mol) of NMP were further added, and the reaction vessel was hermetically sealed under nitrogen gas. While stirring at 400 rpm, the temperature was raised from 200° C.

to 270° C. at a rate of 0.6° C./min, and the reaction was continued at 270° C. for 140 minutes. Thereafter, while cooling the reaction vessel to 240° C. over 20 minutes, 33.3 g (1.85 mol) of water was injected into the system, and then the reaction vessel was cooled from 240° C. to 210° C. at a rate of 0.4° C./min. Thereafter, the reaction vessel was rapidly cooled to near room temperature.

The contents were taken out and diluted with 400 milliliters of NMP, after which the solvent and the solid were filtered off through a sieve (80 mesh). The particles obtained were washed again with 480 milliliters of NMP at 85° C. Thereafter, the particles were washed five times with 840 milliliters of warm water and filtered off to obtain PPS polymer particles. These were heated under a nitrogen stream at 150° C. for 5 hours, and then dried at 150° C. overnight under reduced pressure.

It was shown that the weight average molecular weight of the obtained PPS was 36,100 and that the polydispersity was 2.30. The measurement of the rate of weight loss upon heating of the obtained product showed that ΔWr was 0.25%.

Example 1

To the cyclic polyphenylene sulfide obtained in Reference Example 1, 1 mol % of tetrakis(triphenylphosphine)palladium based on sulfur atoms in the cyclic polyphenylene sulfide was added, and 100 mg of the resulting mixed powder was placed in a glass ampoule, after which the atmosphere in the ampoule was replaced with nitrogen. The ampoule was placed in an electric furnace controlled at 300° C. and heated for 60 minutes, after which the ampoule was taken out and cooled to room temperature to obtain a black solid. The product was completely soluble in 1-chloro naphthalene at 250° C. HPLC determination showed that the conversion of cyclic polyphenylene sulfide into PPS was 93%. The results are shown in Table 1.

GPC determination confirmed the peak derived from cyclic polyphenylene sulfide and the peak of the produced polymer (PPS) and showed that the weight average molecular weight of the obtained PPS was 17,800 and that the polydispersity was 2.11. The measurement of the rate of weight loss upon heating of the obtained product showed that ΔWr was 0.12%. The results of X-ray absorption fine structure analysis of tetrakis(triphenylphosphine)palladium are shown in FIG. 1, which shows that the peak maximum of the absorption coefficient at X-ray absorption near edge after normalization was 2.99.

Example 2

The same operation as in Example 1 was repeated except that tris(dibenzylideneacetone)dipalladium was used in place of tetrakis(triphenylphosphine)palladium used in Example 1 to obtain a black solid. The product was completely soluble in 1-chloro naphthalene at 250° C. HPLC determination showed that the conversion of cyclic polyphenylene sulfide into PPS was 90%. The results are shown in Table 1.

GPC determination confirmed the peak derived from cyclic polyphenylene sulfide and the peak of the produced polymer (PPS) and showed that the weight average molecular weight of the obtained PPS was 42,200 and that the polydispersity was 1.90. The measurement of the rate of weight loss upon heating of the obtained product showed that ΔWr was 0.06%. X-ray absorption fine structure analysis of tris(dibenzylideneacetone)dipalladium showed that the peak maximum of the absorption coefficient at X-ray absorption near edge after normalization was 3.43.

Example 3

The same operation as in Example 1 was repeated except that tetrakis(triphenylphosphine)nickel was used in place of tetrakis(triphenylphosphine)palladium used in Example 1 to obtain a black solid. The product was completely soluble in 1-chloro naphthalene at 250° C. HPLC determination showed that the conversion of cyclic polyphenylene sulfide into PPS was 72%. The results are shown in Table 1.

GPC determination confirmed the peak derived from cyclic polyphenylene sulfide and the peak of the produced polymer (PPS) and showed that the weight average molecular weight of the obtained PPS was 43,500 and that the polydispersity was 1.69. The measurement of the rate of weight loss upon heating of the obtained product showed that ΔWr was 0.19%.

Comparative Example 1

In a glass ampoule, 100 mg of the cyclic polyphenylene sulfide obtained in Reference Example 1 was placed, and the atmosphere in the ampoule was replaced with nitrogen. The ampoule was placed in an electric furnace controlled at 300° C. and heated for 60 minutes, after which the ampoule was taken out and cooled to room temperature to obtain a brown resinoid product. The product was completely soluble in 1-chloro naphthalene at 250° C. HPLC determination showed that the conversion of cyclic polyphenylene sulfide into PPS was 54%. The results are shown in Table 1.

GPC determination confirmed the peak derived from cyclic polyphenylene sulfide and the peak of the produced polymer (PPS) and showed that the weight average molecular weight of the obtained PPS was 62,300 and that the polydispersity was 1.77.

Comparative Example 2

The same operation as in Comparative Example 1 was repeated except that the heating temperature in the electric furnace was changed to 340° C. to obtain a brown resinoid product. The product was completely soluble in 1-chloro naphthalene at 250° C. HPLC determination showed that the conversion of cyclic polyphenylene sulfide into PPS was 92%. The results are shown in Table 1.

GPC determination confirmed the peak derived from cyclic polyphenylene sulfide and the peak of the produced polymer (PPS) and showed that the weight average molecular weight of the obtained PPS was 68,200 and that the polydispersity was 2.04. It turned out that, when cyclic polyphenylene sulfide is heated in the absence of a zero-valent transition metal compound, high temperature conditions are required for bringing the conversion of polyphenylene sulfide to completion.

Comparison of the conversion exemplified in Examples 1 to 3 and the conversion shown in Comparative Examples 1 and 2 showed that the zero-valent transition metal compound used in the present invention promoted the conversion of cyclic polyphenylene sulfide into PPS.

Comparative Example 3

The same operation as in Example 1 was repeated except that diphenyl disulfide was used in place of tetrakis(triphenylphosphine)palladium used in Example 1 to obtain a brown solid. The product was completely soluble in 1-chloro naphthalene at 250° C. HPLC determination showed that the conversion of cyclic polyphenylene sulfide into PPS was 63%. The results are shown in Table 1.

GPC determination confirmed the peak derived from cyclic polyphenylene sulfide and the peak of the produced polymer (PPS) and showed that the weight average molecular weight of the obtained PPS was 49,900 and that the polydispersity was 1.77. Although the radical catalyst compound promoted the conversion of cyclic polyphenylene sulfide, the value of the conversion was low compared to that of Examples.

Comparative Example 4

The same operation as in Example 1 was repeated except that a sodium salt of thiophenol was used in place of tetrakis (triphenylphosphine)palladium used in Example 1 to obtain a brown solid. The product was completely soluble in 1-chloro naphthalene at 250° C. HPLC determination showed that the conversion of cyclic polyphenylene sulfide into PPS was 35%. The results are shown in Table 1.

GPC determination confirmed the peak derived from cyclic polyphenylene sulfide and the peak of the produced polymer (PPS) and showed that the weight average molecular weight of the obtained PPS was 26,900 and that the polydispersity was 1.68. The ionic catalyst compound did not promote the conversion of cyclic polyphenylene sulfide, and the value of the conversion was low compared to that of Comparative Example 1.

Example 5

To the cyclic polyphenylene sulfide obtained in Reference Example 1, 0.5 mol % of palladium acetate and 2 mol % of triphenylphosphine, based on sulfur atoms in the cyclic polyphenylene sulfide, were added, and 100 mg of the resulting mixed powder was placed in a glass ampoule, after which the atmosphere in the ampoule was replaced with nitrogen. The ampoule was placed in an electric furnace controlled at 300° C. and heated for 60 minutes, after which the ampoule was taken out and cooled to room temperature to obtain a black solid. The product was completely soluble in 1-chloro naphthalene at 250° C. HPLC determination showed that the conversion of cyclic polyphenylene sulfide into PPS was 74%.

GPC determination confirmed the peak derived from cyclic polyphenylene sulfide and the peak of the produced polymer (PPS) and showed that the weight average molecular weight of the obtained PPS was 23,000 and that the polydispersity was 1.75. The measurement of the rate of weight loss upon heating of the obtained product showed that ΔWr was 0.08%. The results are shown in Table 2.

TABLE 1

| | Catalyst species | Catalyst amount [1] (mol %) | Reaction temperature (° C.) | Reaction time (min) | Convertion (%) |
|---|---|---|---|---|---|
| Example 1 | Pd(tpp)$_4$ [2] | 1 | 300 | 60 | 93 |
| Example 2 | Pd$_2$(dba)$_3$ [3] | 1 | 300 | 60 | 90 |
| Example 3 | Ni(tpp)$_4$ | 1 | 300 | 60 | 72 |
| Comparative Example 1 | — | — | 300 | 60 | 54 |
| Comparative Example 2 | — | — | 340 | 60 | 92 |
| Comparative Example 3 | PhSSPh [4] | 1 | 300 | 60 | 63 |
| Comparative Example 4 | PhSNa [5] | 1 | 300 | 60 | 35 |

[1] Catalyst amount (mol %) based on sulfur atoms in the cyclic polyphenylene sulfide
[2] tetrakis(triphenylphosphine)palladium
[3] tris(dibenzylideneacetone)dipalladium
[4] diphenyl disulfide
[5] sodium salt of thiophenol Example 4

The same operation as in Example 1 was repeated except that the amount of tetrakis(triphenylphosphine)palladium added was 0.5 mol % to obtain a brown solid. The product was completely soluble in 1-chloro naphthalene at 250° C. HPLC determination showed that the conversion of cyclic polyphenylene sulfide into PPS was 90%.

GPC determination confirmed the peak derived from cyclic polyphenylene sulfide and the peak of the produced polymer (PPS) and showed that the weight average molecular weight of the obtained PPS was 26,200 and that the polydispersity was 2.24. The measurement of the rate of weight loss upon heating of the obtained product showed that ΔWr was 0.10%. The results are shown in Table 2.

Comparison of the conversions exemplified in Example 1 and Example 4 showed that, when the zero-valent transition metal compound of the present invention is used, cyclic polyphenylene sulfide converts sufficiently into PPS even if the concentration used is reduced, and PPS having the above-mentioned properties can be obtained.

Example 6

The same operation as in Example 4 was repeated except that bis[1,2-bis(diphenylphosphino)ethane]palladium was used in place of tetrakis(triphenylphosphine)palladium used in Example 4 to obtain a black solid. HPLC determination showed that the conversion of cyclic polyphenylene sulfide into PPS was 99%.

GPC determination confirmed the peak derived from cyclic polyphenylene sulfide and the peak of the produced polymer (PPS) and showed that the weight average molecular weight of the obtained PPS was 36,700 and that the polydispersity was 2.50. The product was partially insoluble in 1-chloro naphthalene at 250° C., but infrared spectroscopic analysis showed that the insoluble matter was not a compound having phenylene sulfide structure. The measurement of the rate of weight loss upon heating of the obtained product showed that ΔWr was 0.15%. The results are shown in Table 2. X-ray absorption fine structure analysis of bis[1,2-bis(diphenylphosphino)ethane]palladium showed that the peak maximum of the absorption coefficient at X-ray absorption near edge after normalization was 2.07.

Example 7

To the cyclic polyphenylene sulfide obtained in Reference Example 1, 0.5 mol % of palladium chloride and 1 mol % of 1,2-bis(diphenylphosphino)ethane, based on sulfur atoms in the cyclic polyphenylene sulfide, were added, and 100 mg of the resulting mixed powder was placed in a glass ampoule, after which the atmosphere in the ampoule was replaced with nitrogen. The ampoule was placed in an electric furnace controlled at 300° C. and heated for 60 minutes, after which the ampoule was taken out and cooled to room temperature to obtain a brown solid. The product was partially insoluble in 1-chloro naphthalene at 250° C. HPLC determination showed that the conversion of cyclic polyphenylene sulfide into PPS was 72%.

The measurement of the rate of weight loss upon heating of the obtained product showed that $\Delta Wr$ was 0.02%. The results are shown in Table 2.

Example 8

To the cyclic polyphenylene sulfide obtained in Reference Example 1, 1 mol % of nickel chloride and 2 mol % of 1,2-bis(diphenylphosphino)ethane, based on sulfur atoms in the cyclic polyphenylene sulfide, were added, and 100 mg of the resulting mixed powder was placed in a glass ampoule, after which the atmosphere in the ampoule was replaced with nitrogen. The ampoule was placed in an electric furnace controlled at 300° C. and heated for 60 minutes, after which the ampoule was taken out and cooled to room temperature to obtain a brown solid. The product was partially insoluble in 1-chloro naphthalene at 250° C. HPLC determination showed that the conversion of cyclic polyphenylene sulfide into PPS was 72%.

The measurement of the rate of weight loss upon heating of the obtained product showed that $\Delta Wr$ was 0.12%. The results are shown in Table 2.

Example 9

The same operation as in Example 4 was repeated except that [1,2-bis(diphenylphosphino)ethane]palladium dichloride was used in place of tetrakis(triphenylphosphine)palladium used in Example 4 to obtain a brown solid. The product was completely soluble in 1-chloro naphthalene at 250° C. HPLC determination showed that the conversion of cyclic polyphenylene sulfide into PPS was 70%.

The measurement of the rate of weight loss upon heating of the obtained product showed that $\Delta Wr$ was 0.02%. The results are shown in Table 2.

Comparison of the conversion exemplified in Examples 4 to 9 and the conversion shown in Comparative Example 1 showed that the polymerization catalyst promoted the conversion of cyclic polyphenylene sulfide into PPS either when a zero-valent transition metal compound were directly added or when a zero-valent transition metal compound was formed within the system.

Comparative Example 5

The same operation as in Example 4 was repeated except that palladium chloride was used in place of tetrakis(triphenylphosphine)palladium used in Example 4 to obtain a black solid. The product was partially insoluble in 1-chloro naphthalene at 250° C. HPLC determination showed that the conversion of cyclic polyphenylene sulfide into PPS was 32%. The results are shown in Table 2.

Figure 2:
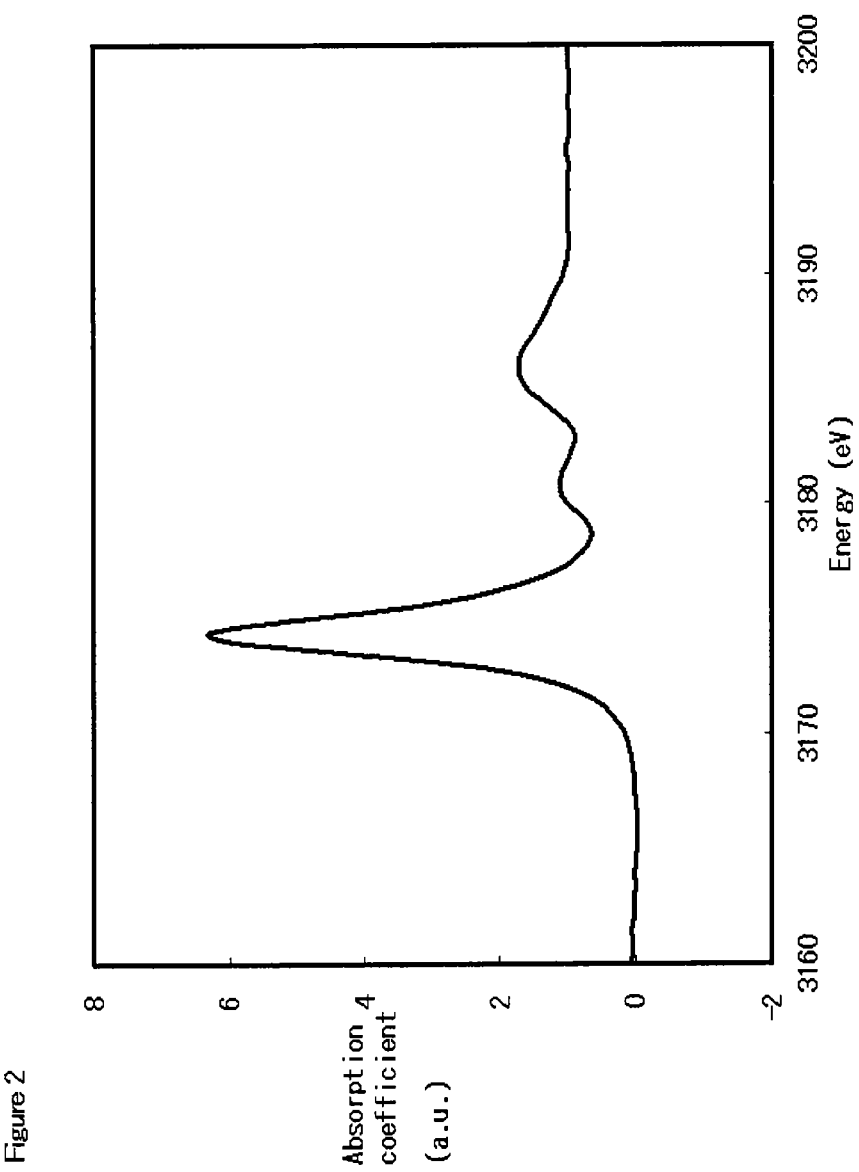
FIG. 2 is a chart of X-ray absorption fine structure analysis of palladium chloride.

Palladium chloride did not promote the conversion of cyclic polyphenylene sulfide. The results of X-ray absorption fine structure analysis of palladium chloride are shown in FIG. 2, which shows that the peak maximum of the absorption coefficient at X-ray absorption near edge after normalization was 6.32.

Comparative Example 6

To the cyclic polyphenylene sulfide obtained in Reference Example 1, 1 mol % of nickel chloride based on sulfur atoms in the cyclic polyphenylene sulfide was added, and 100 mg of the resulting mixed powder was placed in a glass ampoule, after which the atmosphere in the ampoule was replaced with nitrogen. The ampoule was placed in an electric furnace controlled at 300° C. and heated for 60 minutes, after which the ampoule was taken out and cooled to room temperature to obtain a brown solid. The product was completely soluble in 1-chloro naphthalene at 250° C. HPLC determination showed that the conversion of cyclic polyphenylene sulfide into PPS was 42%. The results are shown in Table 2.

Nickel chloride did not promote the conversion of cyclic polyphenylene sulfide.

Comparison of the conversion exemplified in Example 7 and the conversion shown in Comparative Example 5 and comparison of the conversion exemplified in Example 8 and the conversion shown in Comparative Example 6 showed that the transition metal salts other than zero-valent did not promote the conversion of cyclic polyarylene sulfide.

Comparative Example 7

The same operation as in Example 4 was repeated except that 2,2'-dithiobis(benzothiazole) was used in place of tetrakis(triphenylphosphine)palladium used in Example 4 to obtain a black solid. The product was completely soluble in 1-chloro naphthalene at 250° C. HPLC determination showed that the conversion of cyclic polyphenylene sulfide into PPS was 63%.

GPC determination confirmed the peak derived from cyclic polyphenylene sulfide and the peak of the produced polymer (PPS) and showed that the weight average molecular weight of the obtained PPS was 27,300 and that the polydispersity was 1.62. The measurement of the rate of weight loss upon heating of the obtained product showed that $\Delta Wr$ was 0.21%. The results are shown in Table 2.

Comparison of the conversion and the rate of weight loss upon heating exemplified in Examples 4 to 9 and the conversion and the rate of weight loss upon heating shown in Comparative Example 7 showed that the present invention, compared to known processes using a radical catalyst compound, promotes the conversion of cyclic polyphenylene sulfide into PPS and further reduces the weight loss upon heating of PPS.

Comparison of the rate of weight loss upon heating exemplified in Examples 4 to 9 and the rate of weight loss upon heating shown in Reference Example 2 showed that the present invention provides the PPS having a lower rate of weight loss upon heating than that of the PPS obtained by a conventional process.

TABLE 2

| | Catalyst species | Catalyst amount [1] (mol %) | Ligand species | Ligand amount [1] (mol %) | Reaction temperature (° C.) | Reaction time (min) | Conversion (%) | Rate of weight loss upon heating (%) [2] |
|---|---|---|---|---|---|---|---|---|
| Example 4 | Pd(tpp)$_4$ [3] | 0.5 | — | — | 300 | 60 | 90 | 0.10 |
| Example 5 | Pd(OAc)$_2$ [4] | 0.5 | tpp [5] | 2 | 300 | 60 | 74 | 0.08 |
| Example 6 | Pd(dppe)$_2$ [6] | 0.5 | — | — | 300 | 60 | 99 | 0.15 |
| Example 7 | PdCl$_2$ | 0.5 | dppe [7] | 1 | 300 | 60 | 72 | 0.02 |
| Example 8 | NiCl$_2$ | 1 | dppe | 2 | 300 | 60 | 72 | 0.12 |
| Example 9 | PdCl$_2$(dppe) [8] | 0.5 | — | — | 300 | 60 | 70 | 0.02 |
| Comparative Example 5 | PdCl$_2$ | 0.5 | — | — | 300 | 60 | 32 | — |
| Comparative Example 6 | NiCl$_2$ | 1 | — | — | 300 | 60 | 42 | — |
| Comparative Example 7 | DTB [9] | 0.5 | — | — | 300 | 60 | 63 | 0.21 |
| Reference Example 2 [10] | — | — | — | — | — | — | — | 0.25 |

[1] Catalyst amount (mol %) based on sulfur atoms in the cyclic polyphenylene sulfide
[2] Rate of weight loss upon heating (Δ Wr) = (W1 − W2)/W1 × 100
W1: a sample weight at the time when 100° C. is reached
W2: a sample weight at the time when 330° C. is reached
Heating condition (The rate of temperature rise): 20° C./min from 50° C. to 350° C.
[3] tetrakis(triphenylphosphine)palladium
[4] palladium acetate
[5] triphenyl phosphine
[6] bis[1,2-bis(diphenylphosphino)ethane]palladium
[7] 1,2-bis(diphenylphosphino)ethane
[8] [1,2-bis(diphenylphosphino)ethane]palladium dichloride
[9] 2,2'-dithiobis(benzothiazole)
[10] PPS obtained by a conventional process Example 10

The same operation as in Example 4 was repeated except that the heating time in the electric furnace was changed to 10 minutes to obtain a brown solid. The product was completely soluble in 1-chloro naphthalene at 250° C. HPLC determination showed that the conversion of cyclic polyphenylene sulfide into PPS was 93%. The results are shown in Table 3.

GPC determination confirmed the peak derived from cyclic polyphenylene sulfide and the peak of the produced polymer (PPS) and showed that the weight average molecular weight of the obtained PPS was 24,800 and that the polydispersity was 2.30.

Example 11

The same operation as in Example 2 was repeated except that the heating time in the electric furnace was changed to 10 minutes to obtain a black solid. The product was completely soluble in 1-chloro naphthalene at 250° C. HPLC determination showed that the conversion of cyclic polyphenylene sulfide into PPS was 87%. The results are shown in Table 3.

GPC determination confirmed the peak derived from cyclic polyphenylene sulfide and the peak of the produced polymer (PPS) and showed that the weight average molecular weight of the obtained PPS was 44,100 and that the polydispersity was 1.89.

Comparative Example 8

The same operation as in Comparative Example 1 was repeated except that the heating time in the electric furnace was changed to 10 minutes to obtain a brown solid. The product was completely soluble in 1-chloro naphthalene at 250° C. HPLC determination showed that the conversion of cyclic polyphenylene sulfide into PPS was 12%. The results are shown in Table 3.

Comparison of the conversion exemplified in Examples 10 and 11 and the conversion shown in Comparative Example 8 showed that, according to exemplary embodiments of the present invention, cyclic polyphenylene sulfide can be converted into PPS in a short time.

Comparative Example 9

The same operation as in Comparative Example 3 was repeated except that the heating time in the electric furnace was changed to 10 minutes to obtain a brown solid. The product was completely soluble in 1-chloro naphthalene at 250° C. HPLC determination showed that the conversion of cyclic polyphenylene sulfide into PPS was 16%. The results are shown in Table 3.

GPC determination confirmed the peak derived from cyclic polyphenylene sulfide and the peak of the produced polymer (PPS) and showed that the weight average molecular weight of the obtained PPS was 14,700 and that the polydispersity was 1.33.

In a short-time polymerization using a radical catalyst compound, compared to Examples, the conversion of cyclic polyphenylene sulfide into PPS was insufficient.

Comparison of the conversion exemplified in Examples 10 and 11 and the conversion shown in Comparative Example 9 showed that, according to exemplary embodiments of the present invention, cyclic polyphenylene sulfide can be converted into PPS in even a short time, in which time known processes using a radical catalyst compound show no effect.

TABLE 3

| | Catalyst species | Catalyst amount [1] (mol %) | Reaction temperature (° C.) | Reaction time (min) | Conversion (%) |
|---|---|---|---|---|---|
| Example 10 | Pd(tpp)$_4$ [2] | 0.5 | 300 | 10 | 93 |
| Example 11 | Pd$_2$(dba)$_3$ [3] | 1 | 300 | 10 | 87 |

TABLE 3-continued

|  | Catalyst species | Catalyst amount [1] (mol %) | Reaction temperature (° C.) | Reaction time (min) | Conversion (%) |
|---|---|---|---|---|---|
| Comparative Example 8 | — | — | 300 | 10 | 12 |
| Comparative Example 9 | PhSSPh [4] | 1 | 300 | 10 | 16 |

[1] Catalyst amount (mol %) based on sulfur atoms in the cyclic polyphenylene sulfide
[2] tetrakis(triphenylphosphine)palladium
[3] tris(dibenzylideneacetone)dipalladium
[4] diphenyl disulfide Example 12

The same operation as in Example 10 was repeated except that the heating temperature in the electric furnace was changed to 260° C. to obtain a brown solid. The product was completely soluble in 1-chloro naphthalene at 250° C. HPLC determination showed that the conversion of cyclic polyphenylene sulfide into PPS was 93%. The results are shown in Table 4.

GPC determination confirmed the peak derived from cyclic polyphenylene sulfide and the peak of the produced polymer (PPS) and showed that the weight average molecular weight of the obtained PPS was 19,700 and that the polydispersity was 1.95.

Example 13

The same operation as in Example 11 was repeated except that the heating temperature in the electric furnace was changed to 260° C. to obtain a black solid. The product was completely soluble in 1-chloro naphthalene at 250° C. HPLC determination showed that the conversion of cyclic polyphenylene sulfide into PPS was 81%. The results are shown in Table 4.

GPC determination confirmed the peak derived from cyclic polyphenylene sulfide and the peak of the produced polymer (PPS) and showed that the weight average molecular weight of the obtained PPS was 49,500 and that the polydispersity was 1.83.

Example 14

The same operation as in Example 6 was repeated except that the heating temperature in the electric furnace was changed to 260° C. and that the heating time was changed to 10 minutes to obtain a brown solid. HPLC determination showed that the conversion of cyclic polyphenylene sulfide into PPS was 99%. The results are shown in Table 4.

GPC determination confirmed the peak derived from cyclic polyphenylene sulfide and the peak of the produced polymer (PPS) and showed that the weight average molecular weight of the obtained PPS was 31,900 and that the polydispersity was 2.15. The product was partially insoluble in 1-chloro naphthalene at 250° C., but IR measurement showed that the insoluble matter was not a compound having phenylene sulfide structure.

Comparative Example 10

The same operation as in Comparative Example 8 was repeated except that the heating temperature in the electric furnace was changed to 260° C. to obtain a brown solid. The product was completely soluble in 1-chloro naphthalene at 250° C. HPLC determination showed that the conversion of cyclic polyphenylene sulfide into PPS was 2%. The results are shown in Table 4.

Comparison of the conversion exemplified in Examples 12 to 14 and the conversion shown in Comparative Example 10 showed that, according to exemplary embodiments of the present invention, cyclic polyphenylene sulfide can be converted into PPS at a low temperature and in a short time.

TABLE 4

|  | Catalyst species | Catalyst amount [1] (mol %) | Reaction temperature (° C.) | Reaction time (min) | Conversion (%) |
|---|---|---|---|---|---|
| Example 12 | Pd(tpp)$_4$ [2] | 0.5 | 260 | 10 | 93 |
| Example 13 | Pd$_2$(dba)$_3$ [3] | 1 | 260 | 10 | 81 |
| Example 14 | Pd(dppe)$_2$ [4] | 0.5 | 260 | 10 | 99 |
| Comparative Example 10 | — | — | 260 | 10 | 2 |

[1] Catalyst amount (mol %) based on sulfur atoms in the cyclic polyphenylene sulfide
[2] tetrakis(triphenylphosphine)palladium
[3] tris(dibenzylideneacetone)dipalladium
[4] bis[1,2-bis(diphenylphosphino)ethane]palladium

The invention claimed is:

1. A process for producing polyarylene sulfide, comprising heating a cyclic polyarylene sulfide in the presence of a zero-valent transition metal compound.

2. The process for producing polyarylene sulfide according to claim 1, wherein the heating is carried out under substantially solvent-free conditions.

3. The process for producing polyarylene sulfide according to claim 1, wherein the zero-valent transition metal compound is a compound comprising a Group 8 to Group 11 and Period 4 to Period 6 transition metal(s) of the periodic table.

4. The process for producing polyarylene sulfide according to claim 1, wherein the heating is carried out in the presence of 0.001 to 20 mol % of the zero-valent transition metal compound based on sulfur atoms in the cyclic polyarylene sulfide.

5. The process for producing polyarylene sulfide according to claim 1, wherein the heating is carried out at 300° C. or less.

6. The process for producing polyarylene sulfide according to claim 1, wherein the heating is carried out at 180 to 270° C.

7. The process for producing polyarylene sulfide according to claim 1, wherein the cyclic polyarylene sulfide comprises a cyclic compound represented by the Formula below in an amount of not less than 50% by weight and that m, the number of repetition, in the Formula is 4 to 50:

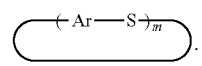

8. The process for producing polyarylene sulfide according to claim 1, wherein the cyclic polyarylene sulfide is cyclic polyphenylene sulfide.

* * * * *